United States Patent
Yuan et al.

(10) Patent No.: US 10,821,512 B2
(45) Date of Patent: Nov. 3, 2020

(54) SYSTEMS AND METHODS FOR CONTROLLING MICROSTRUCTURE OF ADDITIVELY MANUFACTURED COMPONENTS

(71) Applicant: General Electric Company, Schenectady, NY (US)

(72) Inventors: Lang Yuan, Niskayuna, NY (US); Ning Zhou, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 15/400,525

(22) Filed: Jan. 6, 2017

(65) Prior Publication Data
US 2018/0193954 A1    Jul. 12, 2018

(51) Int. Cl.
*B22F 3/105* (2006.01)
*B33Y 10/00* (2015.01)
(Continued)

(52) U.S. Cl.
CPC ............ *B22F 3/1055* (2013.01); *B33Y 10/00* (2014.12); *B33Y 30/00* (2014.12); *B33Y 50/02* (2014.12);
(Continued)

(58) Field of Classification Search
CPC ................ B23K 26/342; B23K 26/083; B23K 26/0869; B23K 26/10; B23K 26/702; B33Y 10/00; B33Y 30/00; B33Y 50/02
(Continued)

(56) References Cited

U.S. PATENT DOCUMENTS 9,254,535 B2   2/2016   Buller et al.
9,321,215 B2   4/2016   Dudley
(Continued)

FOREIGN PATENT DOCUMENTS

EP   2467504 B1   2/2011
EP   3208077 A1   8/2017
(Continued)

OTHER PUBLICATIONS

International Search Report and Written Opinion issued in connection with corresponding PCT Application No. PCT/US2017/067759 dated Apr. 13, 2018, 11 Pages.
(Continued)

*Primary Examiner* — Thien S Tran
(74) *Attorney, Agent, or Firm* — Armstrong Teasdale LLP

(57) ABSTRACT

An additive manufacturing system includes a powder bed and at least one energy source configured to produce at least one energy beam for forming a build layer of a component from the powder bed. The additive manufacturing system further includes a computing device coupled to the at least one energy source. The computing device includes a processor and a memory device. The memory device includes instructions configured to cause the computing device to execute a manufacturing plan for manufacturing the component, receive component thermal data corresponding to at least a portion of the component during manufacturing of the component, and control the at least one energy beam in response to receiving the component thermal data to produce a predetermined microstructure within the portion of the component.

12 Claims, 4 Drawing Sheets

(51) Int. Cl.
 *B33Y 30/00* (2015.01)
 *B33Y 50/02* (2015.01)

(52) U.S. Cl.
 CPC ..... *B22F 2003/1057* (2013.01); *Y02P 10/295* (2015.11)

(58) Field of Classification Search
 USPC ....... 219/121.67, 121.72; 356/318, 414, 601, 356/625
 See application file for complete search history.

(56) References Cited

U.S. PATENT DOCUMENTS

| | | | |
|---|---|---|---|
| 9,346,127 | B2 | 5/2016 | Buller et al. |
| 2009/0206065 | A1 | 8/2009 | Kruth et al. |
| 2011/0042031 | A1* | 2/2011 | Furlong ............... B22D 23/06 164/80 |
| 2014/0163717 | A1* | 6/2014 | Das ..................... B22F 3/1055 700/119 |
| 2014/0265047 | A1* | 9/2014 | Burris ................ B23K 26/034 264/497 |
| 2015/0021815 | A1* | 1/2015 | Albrecht ............... B33Y 30/00 264/235 |
| 2015/0147585 | A1 | 5/2015 | Schwarze et al. |
| 2015/0174822 | A1 | 6/2015 | Huang et al. |
| 2016/0008922 | A1 | 1/2016 | Schwarze |
| 2016/0098825 | A1 | 4/2016 | Dave et al. |
| 2016/0158889 | A1 | 6/2016 | Carter et al. |
| 2016/0207109 | A1 | 7/2016 | Buller et al. |
| 2016/0326880 | A1* | 11/2016 | Slavens ................ B22F 3/1055 |
| 2017/0102689 | A1* | 4/2017 | Khajepour .......... G05B 19/4099 |

FOREIGN PATENT DOCUMENTS

| | | |
|---|---|---|
| JP | 2002-69507 A | 3/2002 |
| JP | 2013502324 A1 | 2/2011 |
| JP | 2016502603 B2 | 5/2014 |
| JP | 2015-193866 A | 11/2015 |

OTHER PUBLICATIONS

European Patent Office Search Report for 17890022.1 dated Aug. 21, 2020, pp. 1-12.
King, W. E. et al.: "Laser powder bed fusion additive manufacturing of metals; physics, computational, and materials challenges", Applied Physics Reviews, American Institute of Physics, Melville, NY, vol. 2, No. 4, Dec. 29, 2015.
Smith, Jacob, et al.: "Linking process, structure, property, and performance for metal-based additive manufacturing: computational approaches with experimental support", Computational Mechanics, Springer, Berlin, DE, vol. 57, No. 4, Jan. 5, 2016, pp. 583-610.
Sames, W.J., et al.: "The metallurgy and processing science of metal additive manufacturing", International Materials Reviews, vol. 61, No. 5, Mar. 7, 2016, pp. 315-360.
Arisoy, Yigit M, et al. "Influence of scan strategy and process parameters on microstructure and its optimization in additively manufactured nickel alloy 625 via laser powder bed fusion", The International Journal of Advanced Manufacturing Technology, vol. 90, No. 5, Sep. 23, 2016, pp. 1393-1417.
Archarya, Ranadip, et al., "Prediction of microstructure in laser powder bed fusion process", ACTA Materialia, Elsevier, vol. 124, Nov. 16, 2016, pp. 360-371.
Notice of Reasons for Refusal for Japanese Patent Application No. 2019-536868, dated Jul. 21, 2020, pp. 1-6.
King W. E. et al.: "Laser powder bed fusion additive manufacturing of metals; physics, computational, and materials challenges", Applied Physics Reviews, American Institute of Physics, Melville, NY, vol. 2, No. 4, Dec. 29, 2015, entire document.

* cited by examiner

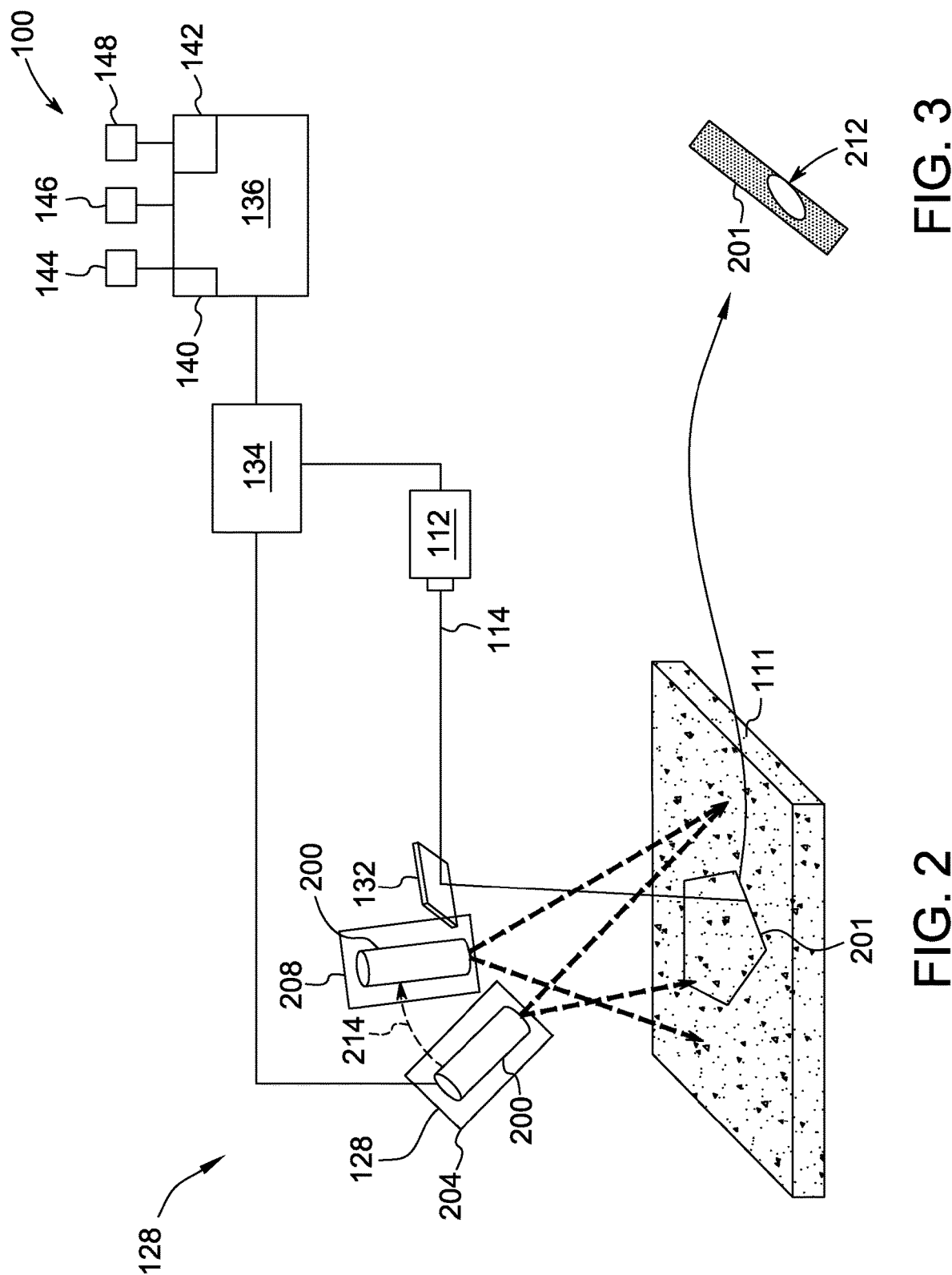

SYSTEMS AND METHODS FOR CONTROLLING MICROSTRUCTURE OF ADDITIVELY MANUFACTURED COMPONENTS

BACKGROUND

The field of the disclosure relates generally to additive manufacturing systems, and more particularly, to systems and methods for dynamically controlling a microstructure of an additively manufactured component.

At least some additive manufacturing systems involve the buildup of a powdered material to make a component. This method can produce complex components from expensive materials at a reduced cost and with improved manufacturing efficiency. At least some known additive manufacturing systems, such as Direct Metal Laser Melting (DMLM) systems, fabricate components using an energy source, such as, without limitation, a laser device, a build plate, and a powder material, such as, without limitation, a powdered metal. An energy beam generated by the energy source is directed to melt the powder material on the build plate in and around the area where the energy beam is incident on the powder material, resulting in a melt pool. As the melt pool cools, the material contained in the melt pool solidifies and develops a microstructure. Characteristics of the microstructure depend on various process parameters including the power of the energy source, the temperature to which the melt pool is raised, the shape of the melt pool, and the rate at which the melt pool cools. Accordingly, control and monitoring of process parameters correlated to characteristics of a component's microstructure are generally required for consistently and accurately manufacturing components using additive manufacturing processes.

BRIEF DESCRIPTION

In one aspect, an additive manufacturing system for manufacturing a component is provided. The additive manufacturing system includes a powder bed, at least one energy source configured to produce at least one energy beam for forming a build layer of a component from the powder bed, and a computing device coupled to the at least one energy source. The computing device includes a processor and a memory device. The memory device stores instructions configured to cause the computing device to execute a manufacturing plan for manufacturing the component, the manufacturing plan including a plurality of manufacturing instructions for manufacturing the component, receive component thermal data corresponding to at least a portion of the component during manufacturing of the component, and control the at least one energy beam in response to receiving the component thermal data to produce a predetermined microstructure within the portion of the component.

In another aspect a method of manufacturing a component using an additive manufacturing system is provided. The additive manufacturing system includes a powder bed, at least one energy source configured to produce at least one energy beam for forming a build layer of a component from the powder bed, and a computing device including at least one processor. The method includes executing a manufacturing plan for manufacturing the component, the manufacturing plan including a plurality of manufacturing instructions for manufacturing the component, receiving component thermal data corresponding to at least a portion of the component during manufacturing of the component, and controlling the at least one energy beam in response to receiving the component thermal data to produce a predetermined microstructure within the portion of the component.

DRAWINGS

These and other features, aspects, and advantages of the present disclosure will become better understood when the following detailed description is read with reference to the accompanying drawings in which like characters represent like parts throughout the drawings, wherein:

FIG. 2 is a perspective view of an exemplary thermal data collection device that may be used with the additive manufacturing system shown in FIG. 1;

FIG. 3 is an enlarged view of an exemplary build layer shown in FIG. 2;

Figure 1:
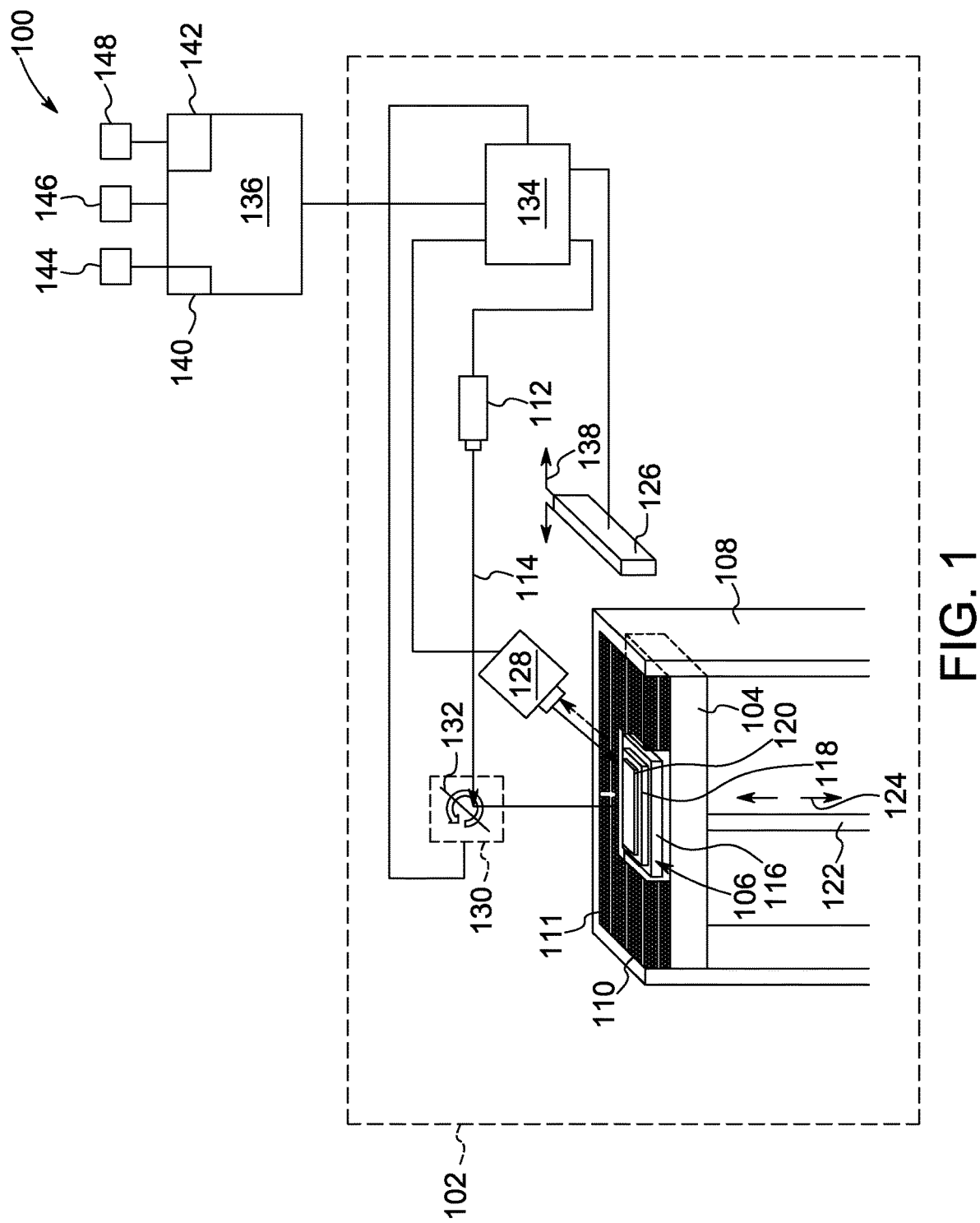
FIG. 1 is a schematic view of an exemplary additive manufacturing system including an additive manufacturing device.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

During a manufacturing process, embodiments of the additive manufacturing system described herein collect thermal data corresponding to the component being manufactured and dynamically adjust the manufacturing process based, at least in part, on the collected thermal data. The additive manufacturing system includes at least one energy source coupled to a computing device having a processor and a memory device. The memory device includes instructions that, when executed, cause the computing device to execute a manufacturing plan to manufacture a component. During execution of the manufacturing plan, the computing device receives component thermal data corresponding to at least a portion of the component being manufactured by the additive manufacturing system in real time and controls an energy beam emitted by the energy source based, at least in part, on the component thermal data. By doing so, the additive manufacturing system facilitates control of the final microstructure of the portion of the component. Such control improves the quality of the manufactured components by improving consistency of the microstructure of the component and reducing the likelihood of manufacturing defects. Moreover, control of the microstructure of the component facilitates manufacturing the component to have multiple portions, each portion having a predetermined microstructure chosen to impart desirable characteristics to the portion. Such characteristics may include, without limitation, strength, ductility, toughness, hardness, corrosion resistance, thermal response, and wear resistance.

The manufacturing plan generally includes instructions configured to induce the additive manufacturing system to manufacture a component. For example, the manufacturing plan may include instructions configured to control one or more energy sources of the additive manufacturing system. In some embodiments, the computing device is further configured to generate the manufacturing plan based on received component model data including component model data corresponding to a predetermined microstructure of a portion of the component being manufactured. More specifically, the computing device applies the received component model data to a predictive model configured to generate manufacturing instructions of the manufacturing plan for producing the predetermined microstructure within the portion of the component. Additional component model data that may be received by the computing device and applied to the predictive model include, without limitation, geometric data, such as a three-dimensional model of the component or a portion thereof, and material properties, such as thermal properties, of the powder bed.

The manufacturing plan may further include target thermal data for the component to facilitate manufacturing of the component and, more specifically, for development of the predetermined microstructure. For example, in certain embodiments, the manufacturing plan includes a thermal plan including target temperature values for portions of the component during the manufacturing process. Target temperature values include, without limitation, maximum temperatures, minimum temperatures, and temperature gradients. Target temperature values may further incorporate temporal aspects. For example, target temperature values may include changes in temperature over time and target temperature ranges to be maintained over time. The target temperature values may then be used to facilitate control of the additive manufacturing system in light of the received thermal data. More specifically, a feedback loop for controlling the additive manufacturing system may be established through comparing the target temperature values to the received thermal data.

In other embodiments, the additive manufacturing system is further configured to improve and refine the manufacturing plans. More specifically, the additive manufacturing system identifies deviations between the manufacturing plan (or parts thereof, such as the thermal plan) and the component thermal data received by the additive manufacturing system, and generates corresponding corrective actions for reducing the deviations. The additive manufacturing system may then modify the manufacturing plan based on the corrective action. Modifying the manufacturing plan includes one or both of modifying the manufacturing plan itself or modifying the predictive model used to generate the manufacturing plan. By doing so, the manufacturing plan is iteratively improved to better reflect factors affecting the manufacturing process.

FIG. 1 is a schematic illustration of an exemplary additive manufacturing system 100 including an additive manufacturing device 102. In the exemplary embodiment, additive manufacturing system 100 is a direct metal laser melting (DMLM) system. Although the embodiments herein are described with reference to DMLM systems, this disclosure may also apply to other types of additive manufacturing systems, such as liquid-resin based additive manufacturing systems (e.g., stereolithograpy systems) or selective laser melting systems.

Additive manufacturing device 102 includes a build platform 104 for supporting a three-dimensional component 106 during the additive manufacturing process, a reservoir 108 of build material 110, also known as a powder bed 111, and an energy source 112 that emits an energy beam 114 for sintering, curing, hardening, or otherwise solidifying a portion of powder bed 111 to form a plurality of superposed build layers 116, 118, and 120 that form component 106. A front wall of reservoir 108 is omitted in FIG. 1 for clarity. Similarly, portions of powder bed 111 are omitted in FIG. 1 for clarity. In the exemplary embodiment, three-dimensional component 106 is an aircraft component, although additive manufacturing system 100 may be used to fabricate any three-dimensional component. Build platform 104 is coupled to vertical adjuster 122 such that build platform may be raised and/or lowered along a vertical direction 124 to adjust the plane in which powder bed 111 is to be solidified.

In the exemplary embodiment, energy source 112 is a laser. More specifically, energy source 112 is a fiber laser or a diode laser. In alternative embodiments, energy source 112 may be any suitable energy source for sintering, curing, hardening, or otherwise solidifying powder bed 111, such as, for example, an ultraviolet laser, light source, gas laser, such as a carbon dioxide ($CO_2$) laser, or electron beam generator. In alternative embodiments, additive manufacturing system 100 includes two or more energy sources 112 that have similar power or different power that enables additive manufacturing system 100 to function as described herein. Further, in the exemplary embodiment, build material 110 is a metallic powder. More specifically, build material 110 is a gas atomized metal powder (e.g., cobalt, iron, aluminum, titanium and/or nickel alloys) having a mean particle size within a range of between approximately 10 and 100 microns.

Additive manufacturing device 102 also includes a build material dispenser, also known as a re-coater assembly 126, for providing a thin layer of build material 110 over powder bed 111 and a previously formed build layer. Additionally, additive manufacturing device 102 includes a thermal data collection device 128 positioned with a field of view of component 106. Thermal data collection device 128 collects thermal data associated with layers 116, 118, and 120 and/or component 106 both during a build process and after a build process has been completed. In the exemplary embodiment, thermal data collection device 128 is one of an infrared sensor, a near-infrared sensor, and a photodiode sensor.

In the exemplary embodiment, additive manufacturing device 102 includes a scanning device 130 for scanning energy beam 114 over selective portions of powder bed 111. In the exemplary embodiment, scanning device 130 includes one or more galvanometer optical scanners 132 and/or one or more motorized mirrors, lenses and/or other optical devices. In alternative embodiments, energy source 112 is coupled to an actuator configured to change the position and/or orientation of energy source 112 relative to component 106.

One or more of build platform 104, re-coater 126, thermal data collection device 128, scanning device 130, and energy source 112, are operatively coupled in communication to a controller 134. In the exemplary embodiment, each of re-coater 126, thermal data collection device 128, scanning device 130, and energy source 112, are operatively coupled to controller 134. Also, in the exemplary embodiment, controller 134 is operatively coupled in communication with a computing device 136.

During operation, additive manufacturing system 100 fabricates component 106 by a layer-by-layer manufacturing process. More specifically, component 106 is fabricated from an electronic representation of the three-dimensional geometry of component 106 stored on computing device 136. For example, the electronic representation is produced in a computer aided design (CAD) or similar electronic file. In alternative embodiments, the electronic representation is any electronic representation that enables additive manufacturing system 100 to operate as described herein. In the exemplary embodiment, the CAD file representing component 106 is converted, for example, by computing device 136, into a layer-by-layer format that includes a plurality of build parameters of each layer. Component 106 is arranged electronically in a desired orientation relative to the origin of the coordinate system used in additive manufacturing system 100. Additionally, the geometry of component 106 is sliced into a stack of two-dimensional layers of a desired thickness, such that the geometry of each layer is an outline of the cross-section through component 106 at that particular layer location. A hatch pattern is generated within each respective layer such that the build parameters are applied along the hatch pattern to fabricate that layer of component 106 from build material 110 and constructing a plan to build component 106. The steps are repeated for each respective layer. Once the process is completed, an electronic computer build file (or files) is generated including all of the layers.

After the build file is generated, additive manufacturing system 100 is operated to manufacture component 106 by implementing a manufacturing plan based on the build file and configured to induce additive manufacturing system 100 to manufacture component 106 layer by layer. The exemplary layer-by-layer manufacturing process does not use a pre-existing article as the precursor to the final component, rather the process produces component 106 from a raw material in a configurable form, such as the powdered build material 110. For example, and without limitation, a steel alloy material is additively manufactured using a steel alloy powder. Additive manufacturing system 100 enables fabrication of components using a broad range of materials, for example, metals, ceramics, and polymers.

As used herein, the term "parameter" refers to characteristics that are used to define the operating conditions of additive manufacturing system 100, such as a power output of energy source 112, a vector scanning speed of energy source 112, a raster power output of energy source 112, a raster scanning speed of energy source 112, a raster tool path of energy source 112, and a contour power output of energy source 112 within additive manufacturing system 100. In some embodiments, the parameters are initially input by a user into computing device 136. The parameters represent a given operating state of additive manufacturing system 100. In general, during raster scanning, energy beam 114 is scanned sequentially along a series of substantially straight hatch lines spaced apart and parallel to each other. During vector scanning, energy beam 114 is generally scanned sequentially along a series of substantially straight hatch lines or vectors, wherein the orientation of the vectors relative to each other sometimes varies. In general, the ending point of one vector coincides with the beginning point of the next vector. Vector scanning is generally used to define the outer contours of a component, whereas raster scanning is generally used to "fill" the spaces enclosed by the contour, where component 106 is solid.

During operation of additive manufacturing system 100, re-coater 126 is positioned adjacent build platform 104. As re-coater 126 moves along direction 138, re-coater 126 deposits a layer of build material 110 on build platform forming powder bed 111. After a new layer of build material 110 is deposited, energy source 112 channels energy beam 114 through scanning device 130, which directs energy beam 114 over selective portions of powder bed 111. For example, galvanometer 132 of scanning device 130 directs energy beam 114 over selective portions of powder bed 111 forming a new build layer, such as layer 120, of component 106. For the next layer, build platform 104 through vertical adjuster 122 moves powder bed 111 downward along direction 124 such that re-coater 126 can make another pass along powder bed 111 to deposit another layer of build material 110 and to facilitate forming another build layer of component 106. This process is then repeated for a plurality of layers, for example, layers 116, 118, and 120, to form component 106. During and/or after each build layer, thermal data collection device 128 collects thermal data of the build layer. The thermal data is transmitted to computing device 136 through controller 134. Computing device 136 analyzes the received component thermal data and, in response, controls energy beam 114, accordingly.

In the exemplary embodiment, build platform 104, energy source 112, re-coater 126, thermal data collection device 128, and scanning device 130 are operatively controlled by controller 134. Controller 134 is any controller typically provided by a manufacturer of additive manufacturing system 100 to control operation thereof. Controller 134 is operatively coupled to computing device 136. In alternative embodiments, embodiments, controller 134 is a computer system that includes at least one processor and at least one memory device.

Computing device 136 includes at least one memory device 140 and at least one processor 142 coupled to memory device 140. In some embodiments, processor 142 includes one or more processing units, such as, without limitation, a multi-core configuration. In the exemplary embodiment, processor 142 includes a field programmable gate array (FPGA). Alternatively, processor 142 is any type of processor that permits computing device 136 to operate as described herein. In some embodiments, executable instructions are stored in memory device 140. Computing device 136 is configurable to perform one or more operations described herein by programming processor 142. For example, processor 142 is programmed by encoding an operation as one or more executable instructions and providing the executable instructions in memory device 140. In the exemplary embodiment, memory device 140 is one or more devices that enable storage and retrieval of information such as executable instructions or other data. In some embodiments, memory device 140 includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In the exemplary embodiment, memory device 140 is configured to store build parameters including, without limitation, real-time and historical build parameter values, or any other type of data. In the exemplary embodiment, memory device 140 stores component thermal data collected by thermal data collection device 128. In alternative embodiments, memory device 140 further stores any data that enable additive manufacturing system 100 to operate as described herein. In some embodiments, processor 142 removes or "purges" data from memory device 140 based on the age of the data. For example, processor 142 overwrites previously recorded and stored data associated with a subsequent time or event. In addition, or alternatively, processor 142 removes data that exceeds a predetermined time interval. In addition, memory device 140 includes, without limitation, sufficient data, algorithms, and commands to facilitate monitoring and measuring of build parameters and the geometric conditions of component 106 fabricated by additive manufacturing system 100.

In the exemplary embodiment, memory device 140 includes instructions that, when executed by computing device 136, facilitate execution of the manufacturing plan to build a component. During execution of the manufacturing plan, the instructions further facilitate receipt of real-time component thermal data corresponding to the component and subsequent control of system parameters by computing device 136 in response to the component thermal data. For example, in the exemplary embodiment, computing device 136 is configured to control energy source 112 such that energy beam 114 produces a predetermined microstructure for a portion of the component being manufactured.

In some embodiments, computing device 136 is further configured to generate the manufacturing plan in response to receiving component model data. More specifically, computing device 136 is configured to apply component model data corresponding to a predetermined microstructure of the component to a predictive model to generate manufacturing instructions for producing the predetermined microstructure. The manufacturing instructions are then used to generate the manufacturing plan. In addition to component model data corresponding to predetermined microstructures, component model data may further include, without limitation, geometric data (such as a CAD file or similar representation of the component), material properties of the powder bed, and characteristics of the additive manufacturing systems and its components, such as energy source 112.

Computing device 136 also includes a presentation interface 144 coupled to processor 142. Presentation interface 144 presents information, such as thermal data collected by thermal data collection device 128, to a user. In one embodiment, presentation interface 144 includes a display adapter (not shown) coupled to a display device (not shown), such as a cathode ray tube (CRT), a liquid crystal display (LCD), an organic LED (OLED) display, or an "electronic ink" display. In some embodiments, presentation interface 144 includes one or more display devices. In addition, or alternatively, presentation interface 144 includes an audio output device (not shown), for example, without limitation, an audio adapter or a speaker (not shown).

In the exemplary embodiment, computing device 136 includes a user input interface 146. In the exemplary embodiment, user input interface 146 is coupled to processor 142 and receives input from the user. In some embodiments, user input interface 146 includes, for example, without limitation, a keyboard, a pointing device, a mouse, a stylus, a touch sensitive panel, such as, without limitation, a touch pad or a touch screen, and/or an audio input interface, such as, without limitation, a microphone. In further embodiments, a single component, such as a touch screen, functions as both a display device of presentation interface 144 and user input interface 146.

A communication interface 148 is coupled to processor 142 and is configured to be coupled in communication with one or more other devices, such as controller 134, and to perform input and output operations with respect to such devices while performing as an input channel. For example, in some embodiments, communication interface 148 includes, without limitation, a wired network adapter, a wireless network adapter, a mobile telecommunications adapter, a serial communication adapter, or a parallel communication adapter. Communication interface 148 receives a data signal from or transmits a data signal to one or more remote devices.

Presentation interface 144 and communication interface 148 are both capable of providing information suitable for use with the methods described herein, such as, providing information to the user or processor 142. Accordingly, presentation interface 144 and communication interface 148 are referred to as output devices. Similarly, user input interface 146 and communication interface 148 are capable of receiving information suitable for use with the methods described herein and are referred to as input devices.

FIG. 2 is a perspective view of an exemplary thermal data collection device 128 that may be used with additive manufacturing system 100 (shown in FIG. 1). FIG. 3 is an enlarged view of an exemplary build layer 201 that is shown in FIG. 2. Thermal data collection device 128 includes at least one thermal sensor 200 coupled to controller 134 and positioned above build layer 201 and powder bed 111 in vertical direction 124. In the exemplary embodiment, build layer 201 is the next additive layer that is coupled to build layer 120 (shown in FIG. 1) that forms component 106 (also shown in FIG. 1).

In the exemplary embodiment, thermal data collection device 128 includes a single thermal sensor 200 that is positionable, by controller 134 and in response to instructions from computing device 136, within additive manufacturing system 100 (shown in FIG. 1). For example, thermal sensor 200 is positioned at a first predetermined position 204 to collect thermal data from build layer 201 and powder bed 111. Additionally, thermal sensor 200 is positionable at a second predetermined position 208 to collect thermal data from build layer 201 and powder bed 111. In alternative embodiments, thermal data collection device 128 includes a plurality of thermal sensors 200 positioned within additive manufacturing system 100, each of which may be separately positionable between multiple predetermined positions.

During operation, energy beam 114 from energy source 112 is scanned over a portion of powder bed 111 to form the most recent build layer 201 that is part of component 106. As energy beam 114 is scanned across powder bed 111, energy beam 114 selectively heats and melts portions of powder bed 111, forming a melt pool 214 that cools to form a portion of build layer 201. This process is repeated for each layer of component 106 until component 106 has been fully formed.

The process of scanning energy beam 114 may include changing characteristics of energy beam 114 including, without limitation, a direction in which energy beam 114 travels across powder bed 111, a velocity at which energy beam 114 travels across powder bed 111, a power of energy beam 114, and a hatch spacing between successive passes of energy beam 114 across powder bed 111. The characteristics of energy beam 114 are generally controlled based on instructions provided by computing device 136 through controller 134. In the exemplary embodiment, additive manufacturing system 100 includes a scanning device 130 and an energy source 112 that are communicatively coupled to computing device 136 through controller 134. Each of scanning device 130 and energy source 112 are configured to receive instructions to control energy beam 114. For example, in response to instructions from computing device 136, scanning device 130 is configured to change the direction and velocity at which energy beam 114 crosses powder bed 111 and energy source 112 is configured to change a power setting of energy source 112 and/or to turn energy source 112 from an ON state to an OFF state. In certain embodiments, energy source 112 is repositionable within additive manufacturing system 100 and computing device 136 is further configured to provide instructions to move energy source 112 within additive manufacturing system 100. In certain embodiments, additive manufacturing system 100 includes more than one scanning device 130 and more than one energy source 112, each of which may be responsive to instructions received from computing device 136.

During operation of additive manufacturing system 100, thermal sensor 200 collects thermal measurements of component 106. For purposes of this disclosure, thermal measurements of component 106 collected by thermal sensor 200 are generally referred to as "component thermal data." Component thermal data includes any thermal measurement of component 106, in whole or in part, taken during the additive manufacturing process. Accordingly, component thermal data includes, without limitation, thermal measurements taken during or after formation of component 106, including thermal measurements taken of build layers such as build layer 201. Component thermal data further includes thermal measurements of melt pools formed by energy beam 114 from powder bed 111. In certain embodiments, component thermal data is correlated with a time of measurement to facilitate analysis of changes in the thermal characteristics of component 106 or any portion therefore over time, e.g., as component 106 cools.

As thermal data collection device 128 collects component thermal data, the component thermal data is transmitted to computing device 136. Computing device 136 generally uses the component thermal data as feedback to control additive manufacturing system 100. For example, in response to receiving component thermal data, computing device 136 may issue instructions to control energy beam 114. Such instructions include, without limitation, changing the power of energy beam 114, changing a scanning direction of energy beam 114, changing a scanning velocity of energy beam 114, changing a hatch setting corresponding to energy beam 114, and changing a distance between energy source 112 and component 106.

In the exemplary embodiment, memory device 136 stores at least one manufacturing plan, for example, a manufacturing plan corresponding to component 106. In certain embodiments, the manufacturing plan includes instructions configured to induce the additive manufacturing system to manufacture component 106. For example, in certain embodiments the manufacturing plan generally includes instructions configured to control one or more of vertical adjuster 122, re-coater 126, scanning device 130, and energy source 112 (all shown in FIG. 1) to manufacture component 106. Alternatively, the manufacturing plan includes data from which computing device 136 is able to derive instructions for manufacturing component 106. For example, in such alternative embodiments, the manufacturing plan includes geometric data corresponding to component 106 from which computing device 136 is able to generate instructions for one or more of vertical adjuster 122, re-coater 126, scanning device 130, and energy source 112 to facilitate manufacturing of component 106.

In certain embodiments, the manufacturing plan further includes a thermal plan for component 106. As component 106 cools during manufacturing, portions of component 106 develops a microstructure which influence the properties of the corresponding portion of component 106. For example, microstructure influences properties including, without limitation, strength, toughness, ductility, hardness, corrosion resistance, temperature-based behavior, and wear resistance. In the context of additive manufacturing, the microstructure of a component, such as component 106, is generally dictated by the heating and cooling experienced by portions of the component during the manufacturing process. Accordingly, the thermal plan includes one or more target temperature values for a portion of component 106, the one or more target temperature values corresponding to target temperatures of the portion of component 106 during the course of the manufacturing process to achieve a predetermined microstructure. The one or more target temperature values include, without limitation, one or more of an upper temperature limit, a lower temperature limit, a temperature range, and a temperature change, including a temperature change over time. During operation, processor 142 compares component thermal data received from thermal data collection device 128 to the thermal plan to determine whether the portion of component 106 is being manufactured in accordance with the thermal plan. For example, during operation, computing device 136 compares component thermal data corresponding to a build layer of component 106, such as build layer 201, to the thermal plan to determine whether the thermal data is in accordance with the thermal plan. Comparing the component thermal data to the thermal plan includes, without limitation, determining whether the temperature of build layer 201 or a portion thereof is above or below a temperature threshold, determining whether build layer 201 or a portion thereof is within a temperature range, and determining whether build layer 201 or a portion thereof is cooling at a desired rate of temperature change.

To the extent the component thermal data deviates from the thermal plan, processor 142 is configured to identify deviations between the component thermal data and the thermal plan, to generate one or more corrective actions configured to correct the deviation, and to execute the at least one corrective action. In certain embodiments, processor 142 is further configured to modify the manufacturing plan, including modifying the thermal plan, to reflect the corrective action. For example, during operation, processor 142 may determine that a portion of build layer 201 is not reaching a sufficiently high temperature to form a desired microstructure. In response, processor 142 may increase the power of energy source 112 and change the power setting of energy source 112 included in the manufacturing plan.

Also, in certain embodiments, the thermal plan includes target temperature values corresponding to internal portions of component 106. In such embodiments, thermal data collection device 128 may be limited to collecting temperature measurements from only the surface of component 106. Accordingly, processor 142 is configured to determine one or more predicted internal temperature values for comparison with the target temperature values of the thermal plan. More specifically, processor 142 is configured to determine a predicted internal component temperature value by applying an internal temperature predictive model corresponding to component 106 to the received component thermal data.

Further, in certain embodiments, component thermal data collected by thermal data collection device 128 corresponds to a melt pool 214 created during manufacturing of component 106. In such embodiments, the manufacturing plan may further include a melt pool plan including at least one target melt pool characteristic. Melt pool characteristics include, without limitation, a melt pool temperature, length, width, depth, and volume. During operation, processor 142 is configured to determine a melt pool characteristic of melt pool 214 based, at least in part, on the component thermal data and to identify deviations between the melt pool characteristic and target melt pool characteristics of the melt pool plan. In response to identifying a deviation, processor 142 generates at least one corrective action configured to correct the deviation and executes the at least one corrective action. In certain embodiments, processor 142 is further configured to modify the manufacturing plan, such as by modifying the melt pool plan, to include the at least one corrective action.

In certain embodiments, processor 142 is configured to determine melt pool characteristics by applying one or more melt pool predictive models to the component thermal data. More specifically, processor 142 is configured to receive component thermal data corresponding to surface temperatures of melt pool 214 and to apply a melt pool predictive model to the component thermal data to determine the melt pool characteristics.

Figure 4:
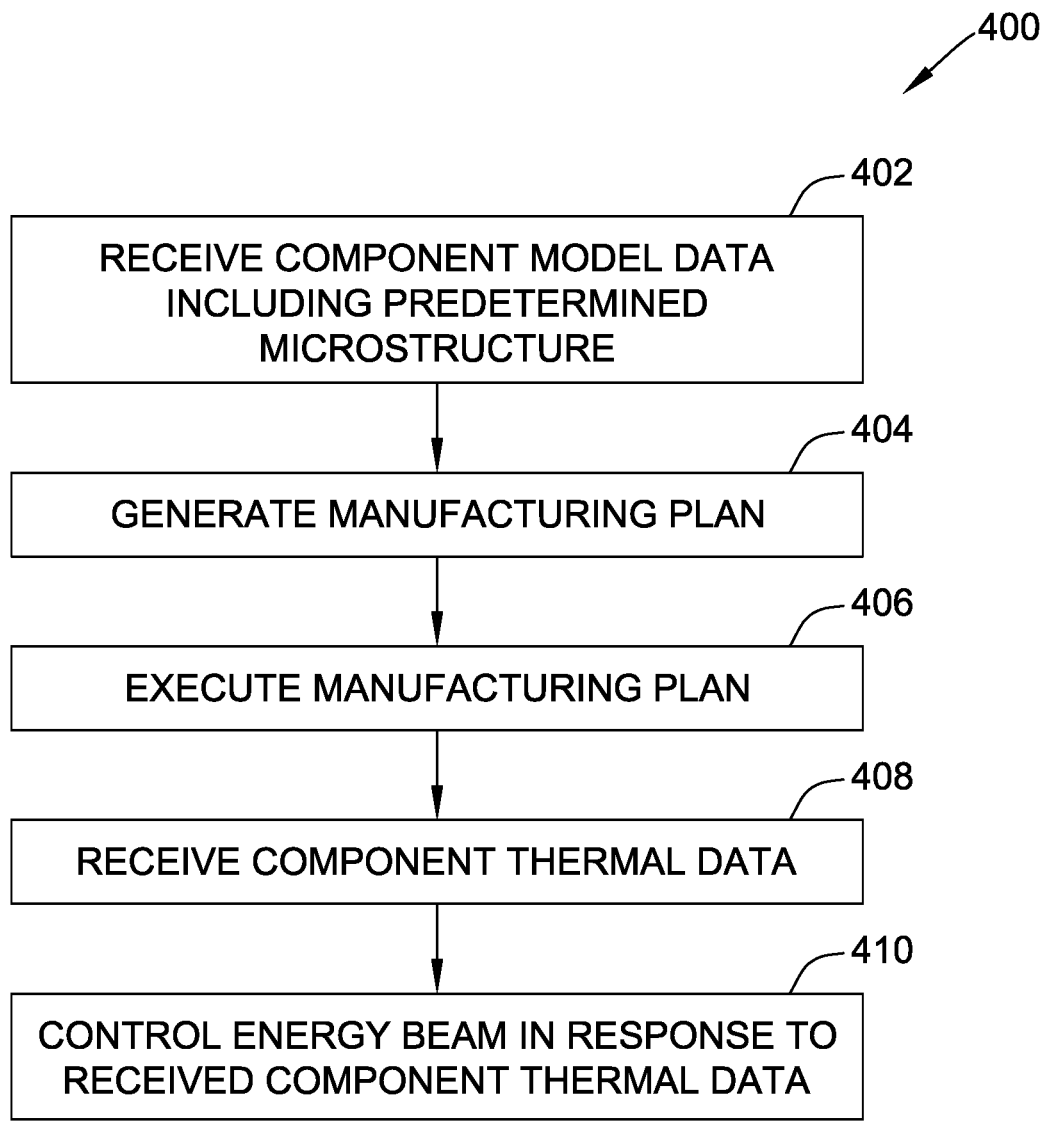
FIG. 4 is a flow chart illustrating a method for manufacturing a component using the additive manufacturing system of FIG. 1.

FIG. 4 is a flow chart illustrating a method 400 for manufacturing a component using additive manufacturing system 100 (shown in FIG. 1). Referring to FIG. 1 and FIG. 4, additive manufacturing system 100 generally includes a powder bed 111 and at least one energy source 112 configured to produce at least one energy beam 114 for forming a build layer, such as build layers 116, 118, and 120, of a component 106 from powder bed 111. Additive manufacturing system 100 further includes a computing device 136 coupled to energy source 112. Computing device 136 includes at least one processor 142 and a memory device 140.

Method 400 includes receiving 402 component model data including a predetermined microstructure to be formed within at least a portion of a component to be manufactured. The component model data may be retrieved from memory device 140 or may be retrieved from data storage (not depicted) communicatively coupled to computing device 136. In addition to the predetermined microstructure, the component model data may further include, without limitation, geometric data for the component being manufactured and material properties of powder bed 111.

The component model data is then used to generate 404 a manufacturing plan. More specifically, the component model data is applied to a predictive model configured to generate manufacturing instructions to produce a component consistent with the component model data. The manufacturing instructions are then collected into a manufacturing plan for manufacturing the component. With respect to forming the predetermined microstructure, the predictive model is configured to generate instructions for controlling, without limitation, movement speed, power, and other parameters of energy source 112 to form the predetermined microstructure. For example, in some embodiments, the predictive model generates instructions to facilitate raising a portion of the component to a temperature, maintaining the temperature for a specified time, and allowing the portion to cool at a rate to facilitate development of the predetermined microstructure.

The method further includes executing 406 the manufacturing plan and receiving component thermal data corresponding to at least a portion of component 106 during execution of the manufacturing plan. In response to receiving the component thermal data, processor 142 controls 404 energy beam 114 of energy source 112 to form the predetermined microstructure. Controlling energy beam 114 includes, without limitation, changing a power of energy source 112, changing a direction of energy beam 114, changing a velocity of energy beam 114, changing a distance between energy source 112 and component 106, changing energy source 112 from an ON state to an OFF state, and changing a hatch spacing setting for energy beam 114.

Figure 5:
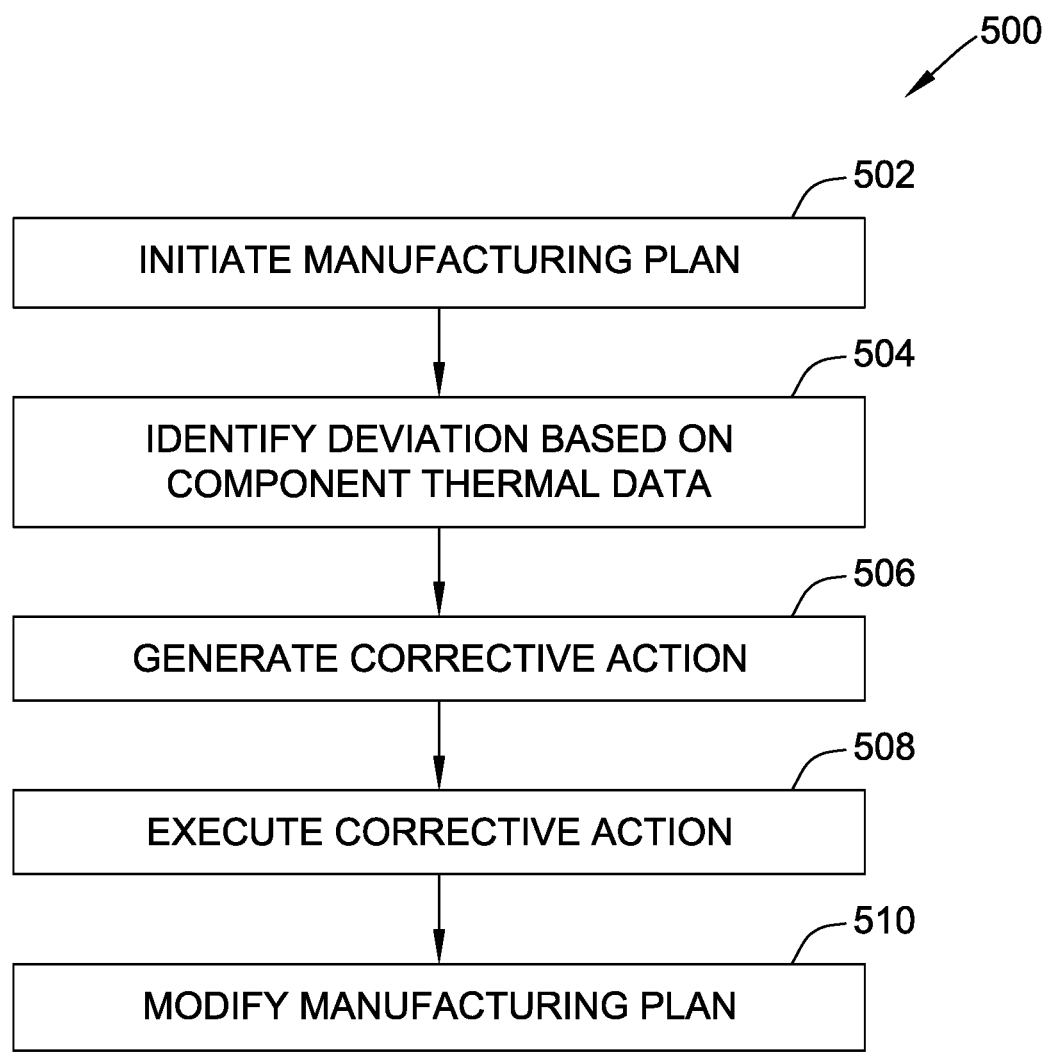
FIG. 5 is a flow chart illustrating an alternative method for manufacturing a component using the additive manufacturing system of FIG. 1.

FIG. 5 is a flow chart illustrating an alternative method 500 for manufacturing a component using additive manufacturing system 100 (shown in FIG. 1). Referring to FIG. 1 and FIG. 4, additive manufacturing system 100 generally includes a powder bed 111 and at least one energy source 112 configured to produce at least one energy beam 114 for forming a build layer, such as build layers 116, 118, and 120, of a component 106 from powder bed 111. Additive manufacturing system 100 further includes a computing device 136 coupled to energy source 112. Computing device 136 includes at least one processor 142.

Method 500 includes initiating 502 a manufacturing plan for manufacturing component 106. The manufacturing plan generally includes instructions configured to induce the additive manufacturing system to manufacture component 106. For example, in certain embodiments the manufacturing plan includes instructions configured to control one or more of vertical adjuster 122, re-coater 126, scanning device 130, and energy source 112 to manufacture component 106. In other embodiments, the manufacturing plan includes data from which computing device 136 is able to derive instructions for manufacturing component 106. For example, in such embodiments, the manufacturing plan includes geometric data corresponding to component 106 from which computing device 136 is able to generate instructions for one or more of vertical adjuster 122, re-coater 126, scanning device 130, and energy source 112 to manufacture component 106 (all shown in FIG. 1).

In certain embodiments, the manufacturing plan includes a thermal plan and/or a melt pool plan. A thermal plan generally includes temperature target values corresponding to portions of component 106 during manufacturing. Similarly, a melt pool plan includes target melt pool characteristics for a melt pool 214 (shown in FIG. 3) during manufacturing. During manufacturing of component 106, processor 142 receives component thermal data corresponding to component 106, such as from thermal data collection device 128, and identifies 504 deviations between the received component thermal data or data derived, at least in part, from the component thermal data and the manufacturing plan, including a thermal plan or melt pool plan included in the manufacturing plan. Identifying such may further include additional processing of the component thermal data including, without limitation, applying one or more predictive models to the component thermal data to generate one or more predicted thermal values and/or predicted melt pool characteristics.

After identifying a deviation, processor 142 generates 506 one or more corrective actions configured to correct the deviation and executes 508 the corrective actions. Following execution of the corrective actions, processor 142 modifies 510 the manufacturing plan to include the corrective actions. In some embodiments, modifying the manufacturing plan includes modifying instructions of the manufacturing plan. For example, if processor 142 determines that a portion of component 106 is not sufficiently heated during manufacturing, processor 142 may generate a corrective action including an instruction to increase a power setting of energy source 112. After executing the corrective action, processor 142 modifies the manufacturing plan to include the increased power setting such that the increased power setting is used during subsequent executions of the manufacturing plan. In other embodiments, modifying the manufacturing plan includes modifying one or more parameters of a predictive model used to generate the manufacturing plan. For example, modifying the manufacturing plan may include modifying a coefficient associated with power of energy source 112 such that subsequent generation of the manufacturing plan includes an adjusted power setting of energy source 112.

Embodiments of the additive manufacturing system described herein facilitate additive manufacturing of components having controlled microstructures. To do so, the additive manufacturing system and methods described herein include computing devices configured to receive component thermal data corresponding to a component being manufactured and to control one or more energy beams in response to the component thermal data. Accordingly, the system and methods described herein facilitate dynamic monitoring and control of the thermal characteristics of an additively manufactured component during the additive manufacturing process. By controlling the thermal characteristics of the component, specific heating and cooling of the component and/or portions thereof may be induced to promote formation of predetermined microstructures. In certain embodiments, additive manufacturing systems described herein are configured to manufacture components in accordance with a manufacturing plan, to dynamically identify and correct deviations from the manufacturing plan based, at least in part, on component thermal data received by the computing device. The computing device is further configured to modify the manufacturing plans to incorporate any corrective actions taken during manufacturing.

An exemplary technical effect of the methods and systems described herein includes: (a) improving quality and consistency of additively manufactured components; (b) facilitating manufacturing of components having multiple portions, each with different microstructures selected for desired characteristics of the respective portion; (c) improving temperature control during an additive manufacturing process; and (d) iteratively improving and refining manufacturing plans, thereby improving the quality and consistency of subsequently manufactured components.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of the additive manufacturing system are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system, said additive manufacturing system comprising:
   a powder bed;
   at least one energy source configured to produce at least one energy beam for forming a build layer of a component from said powder bed; and
   a computing device communicatively coupled to said at least one energy source, said computing device comprising a processor and a memory device, wherein said memory device stores instructions configured to cause said computing device to:
      execute a manufacturing plan for manufacturing the component, the manufacturing plan including a plurality of manufacturing instructions for manufacturing the component and a thermal plan including at least one target temperature value for a portion of the component during manufacturing of the component, wherein the manufacturing plan further includes a melt pool plan including at least one target melt pool characteristic;
      receive, during execution of the manufacturing plan, component thermal data corresponding to at least the portion of the component during manufacturing of the component, wherein the component thermal data corresponds to a melt pool;
      control the at least one energy beam in response to receiving the component thermal data to produce a predetermined microstructure within the portion of the component;
      receive component model data corresponding to the component, the component model data corresponding to the predetermined microstructure;
      generate the manufacturing plan by applying the received component model data to a predictive model, the predictive model configured to generate the plurality of manufacturing instructions to produce the predetermined microstructure within the portion of the component;
      identify a deviation between the component thermal data and the at least one target temperature value;
      generate at least one corrective action to reduce the deviation;
      execute the at least one corrective action; and
      modify at least one of the plurality of manufacturing instructions of the manufacturing plan to include the at least one corrective action by modifying the melt pool plan to reflect the corrective action.

2. The additive manufacturing system in accordance with claim 1 further comprising at least one thermal sensor configured to collect the component thermal data, wherein said computing device is communicatively coupled to said at least one thermal sensor and said instructions further cause said computing device to receive the component thermal data from said at least one thermal sensor.

3. The additive manufacturing system in accordance with claim 2, wherein said at least one thermal sensor comprises at least one of an infrared sensor, a near-infrared sensor, and a photodiode sensor.

4. The additive manufacturing system in accordance with claim 1, wherein said instructions further cause said computing device to control the at least one energy beam in response to receiving the component thermal data by at least one of:
   changing a power setting of said at least one energy source;
   changing a scanning direction of the at least one energy beam;
   changing a scanning velocity of the at least one energy beam;
   changing a distance between said at least one energy source and the component;
   changing said at least one energy source between an ON state and an OFF state; and
   changing a hatch spacing setting for the at least one energy beam.

5. The additive manufacturing system in accordance with claim 1, wherein the at least one target temperature value is at least one internal target temperature value, the component thermal data corresponding to a surface temperature of the component, and said instructions further cause said computing device to:
   determine at least one predicted internal temperature value of the component by applying at least one internal temperature predictive model to the component thermal data; and
   identify the deviation between the component thermal data and the at least one target temperature value by identifying a deviation between the at least one internal target temperature value and the at least one predicted internal temperature value.

6. The additive manufacturing system in accordance with claim 1, wherein said instructions further cause said computing device to:
   determine at least one melt pool characteristic of the melt pool based on the component thermal data; and
   identify a deviation between the at least one melt pool characteristic and the at least one target melt pool characteristic.

7. The additive manufacturing system in accordance with claim 6, wherein each of the at least one melt pool characteristic and the at least one target melt pool characteristic is one of a length of the melt pool, a width of the melt pool, a depth of the melt pool, a volume of the melt pool, and a temperature of the melt pool.

8. The additive manufacturing system in accordance with claim 1, wherein the component thermal data corresponds to a surface temperature of the melt pool and said instructions further cause said computing device to determine the at least one melt pool characteristic by applying at least one melt pool predictive model to the component thermal data.

9. A method of manufacturing a component using an additive manufacturing system, the additive manufacturing system including a powder bed, at least one energy source configured to produce at least one energy beam for forming a build layer of a component from the powder bed, and a computing device coupled to the at least one energy source, the computing device including a processor and a memory device, said method comprising:

executing a manufacturing plan for manufacturing the component, the manufacturing plan including a plurality of manufacturing instructions for manufacturing the component and a thermal plan, the thermal plan including at least one target temperature value for a portion of the component during manufacturing of the component;

receiving, during execution of the manufacturing plan, component thermal data corresponding to at least the portion of the component during manufacturing of the component wherein at least a portion of the component thermal data corresponds to a melt pool, and wherein the manufacturing plan further includes a melt pool plan including at least one target melt pool characteristic;

controlling the at least one energy beam in response to receiving the component thermal data to produce a predetermined microstructure within the portion of the component, wherein controlling the at least one energy source comprises at least one of:

changing a power setting of the at least one energy source;

changing a scanning direction of the at least one energy beam;

changing a scanning velocity of the at least one energy beam;

changing a distance between the at least one energy source and the component;

changing the at least one energy source between an ON state and an OFF state; and changing a hatch spacing setting for the at least one energy beam;

determining at least one melt pool characteristic of the melt pool based on the portion of the component thermal data;

identifying a deviation between the component thermal data and the at least one target temperature value;

generating at least one corrective action to reduce the deviation;

executing the at least one corrective action; and modifying at least one of the plurality of manufacturing instructions of the manufacturing plan to include the at least one corrective action by modifying the melt pool plan to reflect the corrective action.

10. The method in accordance with claim 9 further comprising:

receiving component model data corresponding to the component, the component model data corresponding to the predetermined microstructure; and generating the manufacturing plan by applying the received component model data to a predictive model, the predictive model configured to generate the plurality of manufacturing instructions for producing the predetermined microstructure within the portion of the component.

11. The additive manufacturing system in accordance with claim 1, wherein modifying at least one of the plurality of manufacturing instructions of the manufacturing plan to include the at least one corrective action comprises modifying the thermal plan to reflect the corrective action.

12. The method in accordance with claim 9, wherein modifying at least one of the plurality of manufacturing instructions of the manufacturing plan to include the at least one corrective action comprises modifying the thermal plan to reflect the corrective action.

* * * * *